May 5, 1936.    C. J. ANDERSON, JR    2,039,378
POWER TRANSMISSION
Filed March 14, 1934    5 Sheets-Sheet 2

Inventor
CHARLES J. ANDERSON JR.
By Ralph L. Tweedale
His Attorney

May 5, 1936.  C. J. ANDERSON, JR  2,039,378
POWER TRANSMISSION
Filed March 14, 1934   5 Sheets-Sheet 3

Inventor
CHARLES J. ANDERSON JR.

By Ralph L. Tweedale
His Attorney

Patented May 5, 1936

2,039,378

UNITED STATES PATENT OFFICE 2,039,378

POWER TRANSMISSION

Charles J. Anderson, Jr., Jamestown, N. Y.

Application March 14, 1934, Serial No. 715,571

24 Claims. (Cl. 180—70)

This invention relates to power transmission such as are adapted to transmit power from a prime mover to a load and particularly adapted for use in motor vehicles.

More particularly the invention relates to mounting such a power transmission in a motor vehicle or other support in such a manner as to confine impulses of reactive torque to the transmission casing without transmitting them to the frame to an appreciable degree.

The objects of the invention are:

To provide a power transmission mounted in such a manner as to prevent transmission of torque impulses to the frame in which the transmission is mounted;

To provide mounting means for a transmission adapted to yieldably permit oscillation of the power transmission to the greatest amplitude encountered in ordinary service conditions.

To provide means on a power transmission for limiting the amplitude of oscillation under periodic impulses of reactive torque and generally, To provide a simple rugged and effective mounting for a power transmission.

In certain types of automatic continuously variable power transmissions wherein power is transferred from a driving shaft to a driven shaft in a series of impulses at varying ratios between the speeds and torques of those shafts, respectively, the mechanism of the transmission causes periodic impulses of torque reaction of a complex nature upon the transmission housing or case. If such a transmission is rigidly secured to the frame of a motor vehicle, or other devices with which it is used, these impulses cause disagreeable vibration which is particularly annoying to occupants of the vehicle when such a transmission is used in a vehicle. These impulses occur with varying frequency, depending upon the speed of the driving and driven shafts, and become most disagreeable at low speeds when the power output is low. If such a transmission housing is resiliently secured to the frame in the manner hereinatfer described so as to permit the entire transmission to oscillate about its center of gravity and the degree of resilience of the mountings and their maximum permissible displacement are properly correlated, the transmission as a whole will oscillate about its center of gravity with a certain maximum amplitude and without transmitting any appreciable resultant force to the frame. The amplitude to which the transmission oscillates depends also upon the moment of inertia of the whole transmission, the relation being such that the greater the moment of inertia about the center of gravity of the transmission, the smaller the amplitude to which the transmission will oscillate under alternating torque impulses of a given magnitude and of any frequency. According to the present invention means are also provided for increasing the moment of inertia of the transmission in order to keep down the amplitude of vibration of the same.

Another phenomenon which occurs with a transmission of the type described is that the degree of resilience required in the mountings is much greater at low speeds than it is at high speeds, particularly in the application of the transmission to a motor vehicle, and since higher average torques are transmitted generally at higher speeds it is an object of the invention to provide a resilient mounting which is softer at low speed and low average torque, when the vibration is greatest, and which becomes stiffer as the speed and average torque increases, the degree of resilience being determined by the average torque transmitted at any time.

Other objects and advantages of the present invention will be apparent from the following description, reference being had to the accompanying drawings wherein.

Figure 1:
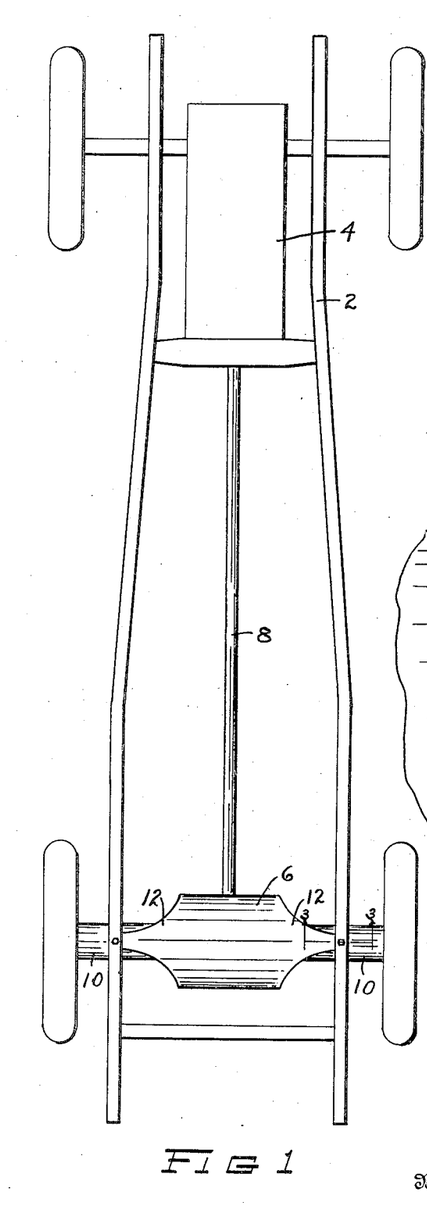
Fig. 1 is a plan view of a motor vehicle embodying one form of the present invention.
Figure 2:
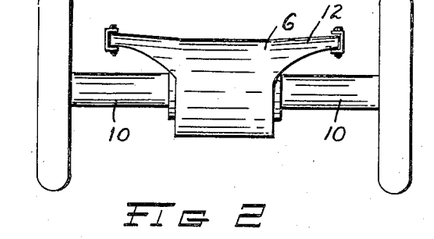
Fig. 2 is a rear view of the same.
Figure 3:
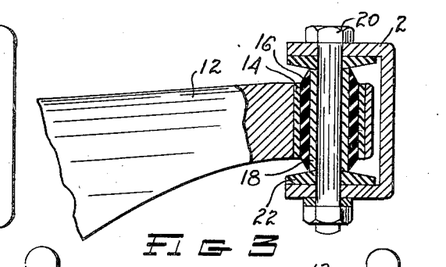
Fig. 3 is a view partially in cross section taken on line 3—3 of Fig. 1 and showing the resilient mounting.
Figure 4:
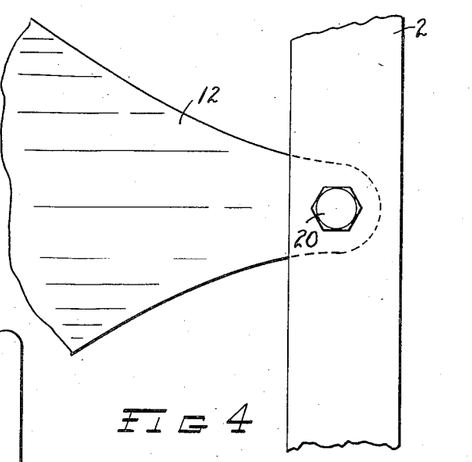
Fig. 4 is a partial plan view of the same mounting.
Figure 5:
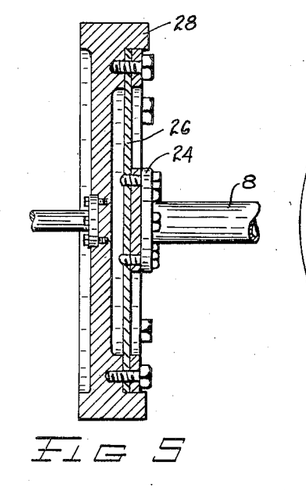
Fig. 5 is a cross sectional view of a universal joint employed in the modification of Fig. 1.
Figure 6:
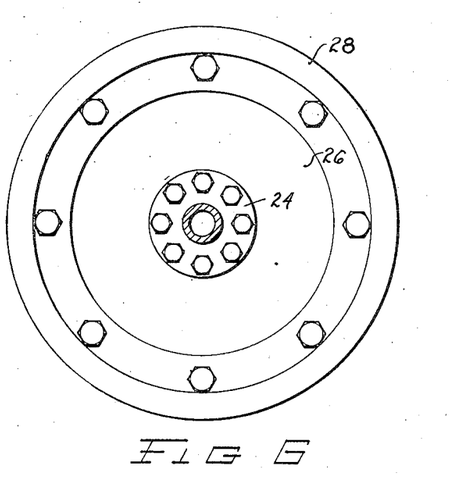
Fig. 6 is an end view of the joint.

Referring now to Fig. 1, there is shown a motor vehicle having a frame 2 carrying on its forward end a motor 4. Toward the rear of the frame and approximately at the intersection of the axis of the motor crankshaft and the axis of the rear wheel axles is located an automatic continuously variable power transmission 6. This transmission may be of any type, the invention being particularly adapted for use with a transmission which transfers power from the motor 4 to the wheels in a succession of periodic torque impulses. A propeller shaft 8 is connected at its forward end to the flywheel of the motor 2 by means of a universal joint construction such as one of those illustrated in Figs. 5–10, inclusive, and is connected at its rear end to the power transmission 6. Shafts 10 connect the power transmission at either side thereof to each of the rear wheels. Shafts 10 are preferably constructed of a resilient material such as rubber, although it is to be understood that any other form of flexible shaft or rigid shaft with flexible couplings may be employed. Transmission 6 carries rigidly secured thereto a pair of support arms 12. The arms 12 are constructed of generous cross section, particularly at their outer ends in order to give increased weight at these points. The outer ends of the arms 12 are secured to the frame 2 by means of a resilient mounting preferably formed of a metal sleeve 14 pressed into a hole in the arm 12 and having a resilient sleeve 16 of rubber vulcanized thereto. Also vulcanized to the sleeve 16 is a metal sleeve 18, longer than the sleeve 14. A bolt 20 passes through the frame 2 and through the sleeve 18, rigidly securing the latter to the frame by means of the spacing washers 22. The propeller shaft 8 is rigidly secured to a shaft of the transmission 6 in such a manner that all rotative movements of the housing 6 about the axis of the shafts 10 are transmitted to the propeller shaft 8. At the forward end of the propeller shaft 8 and connecting the same with the flywheel is located a universal joint which may be of the type shown in Fig. 5. The forward end of shaft 8 carries a flange 24 to which is rigidly bolted a disk 26 preferably formed of sheet metal, the thickness of the disk being of such magnitude in relation to its diameter that a considerable degree of resilience is inherent therein in a direction normal to the plane of the disk. The periphery of the disk 26 is rigidly bolted to the flywheel 28 of the engine 4. It will thus be seen that torque will be readily transmitted from the flywheel 28 to the shaft 8 through the disk 26, while a limited amount of displacement of the axis of shaft 8 relative to the axis of flywheel 28 will be permitted.

Figures 7, 9, 10:
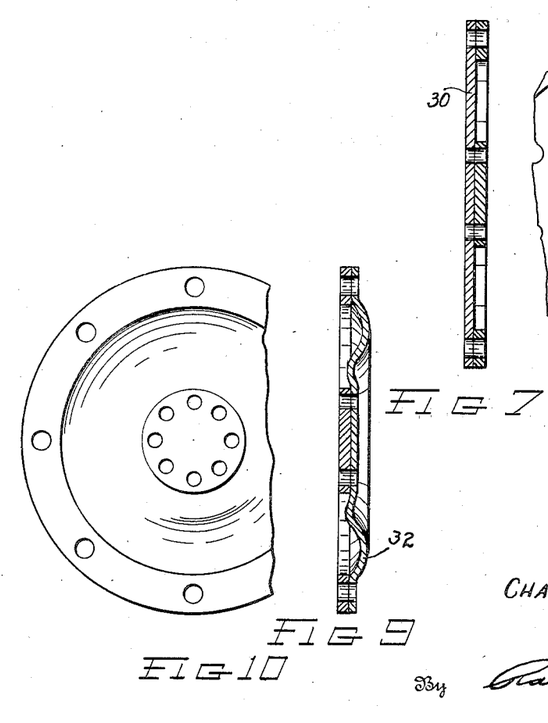
Fig. 7 is a cross sectional view of a modified form of universal joint construction.
Fig. 9 is a cross section of another modified form of universal joint construction.
Fig. 10 is an end view of the same.
Figure 8:
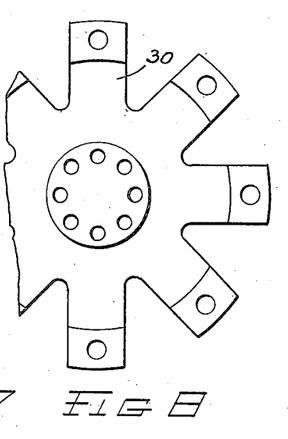
Fig. 8 is an end view of the same.

In Figs. 7 and 8 a modified form of universal joint disk is disclosed wherein a disk 30 may be used in place of the disk 26, the disk 30 being formed of spokes rather than being a continuous solid disk and thus providing for a greater degree of resilience for a given thickness of disk.

In Figs. 9 and 10 there is disclosed a third modification of the construction of the universal joint wherein a disk 32 is provided which is preformed to a reverse cup shape, as clearly shown in Fig. 9, whereby greater angular displacement of the shaft 8 relative to the flywheel 28 will be permitted.

In the operation of the structure so far described it will be seen that as the transmission 6 transmits power from the motor 4 to the wheels in periodic impulses, there will be corresponding periodic impulses of torque reaction upon the housing 6. These impulses will take the form of intermittent couples acting about the axis of the shaft 8 and another series of intermittent couples acting about the axis of the shaft 10. The transmission as a whole, including the housing, may be considered as a single mass mounted for free motion in space. The effects of gravity and of the propeller shaft and axle shafts may be neglected for the present, and, in fact, are practically negligible compared to the magnitude of the intermittent torque reaction impulses. Any alternating couple applied to such a mass suspended in space will cause the mass to oscillate about its center of gravity to a certain amplitude which depends on the moment of inertia of the mass and the magnitude of the couple, but is independent of its frequency or period. The moment of inertia of the transmission, including the mass concentrated in the outer ends of arms 12, is so correlated to the maximum torque transmitted at each impulse that when oscillating to the maximum amplitude attained under the most severe condition encountered the stress of the rubber sleeve 16 is small when the sleeve 14 is displaced to that maximum amplitude. It will thus be seen that the moment of inertia of the entire transmission keeps the maximum amplitude of vibration within a range wherein the oscillating forces exerted by the rubber mounting on the frame are practically negligible. For this reason the impulses of torque reaction are taken up in oscillating the mass of the transmission through a limited range without exerting appreciable force on the frame. The modification just described is particularly adapted for situations where the torque reaction about the propeller shaft is of principal concern.

Figure 11:
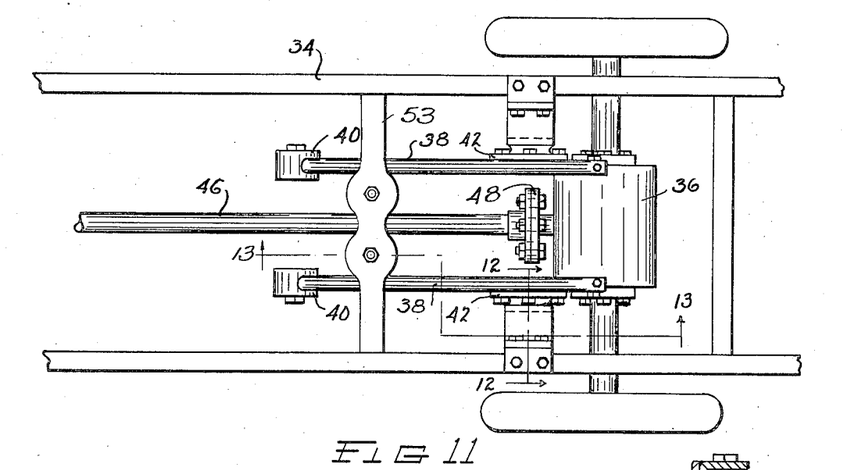
Fig. 11 is a plan view of part of a motor vehicle embodying a second form of the invention.
Figures 12, 13:
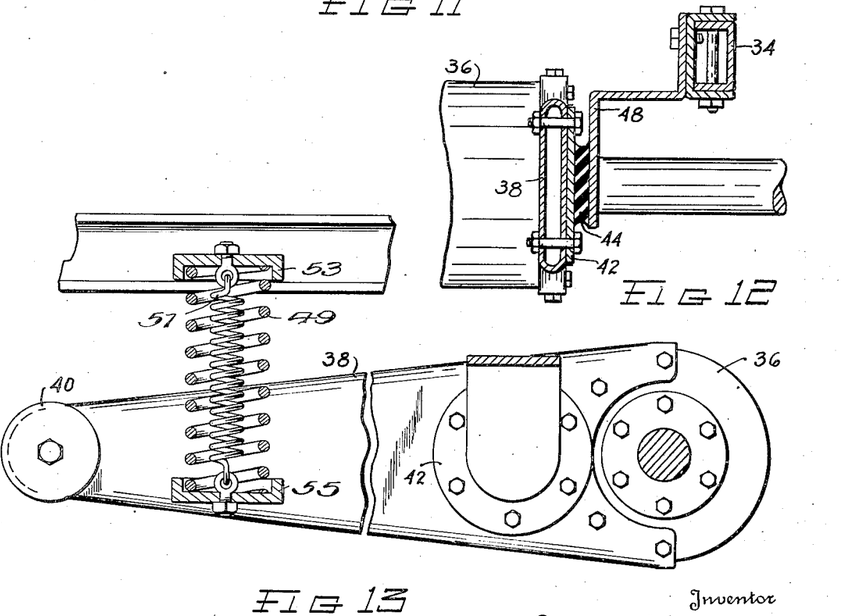
Fig. 12 is a cross section on line 12—12 of Fig. 11.
Fig. 13 is a cross section on line 13—13 of Fig. 11.

In Figs. 11–13, inclusive, there is shown a further modification of the invention which is particularly adapted to absorb impulses of torque reaction about the axis of the wheels, being also adapted to absorb lesser impulses about the propeller shaft axis.

In Fig. 11 there is shown a motor vehicle frame 34 corresponding to the frame 2, previously described. A power transmission 36 is located at the intersection of the wheel axis with the propeller shaft axis and carries rigidly secured thereto on either side thereof a pair of arms 38 formed preferably of flat tubular stock and tapered from one end to the other. At the forward end of the arms 38 there is secured rigidly a pair of balance weights 40 for increasing the moment of inertia of the transmission about an axis parallel to the wheel axis. Bolted to the arms 38 at a point coincident with the center of gravity of the transmission, the arms 38 and weights 40 taken as a whole, are a pair of plates 42 having rubber disks 44 secured thereto as by vulcanization. Disks 44 are also vulcanized to frame brackets 48 which are bolted to the frame 34. The propeller shaft 46 is provided with a universal joint 48, which may be of any well known type, and is located coincident with the center of gravity of the transmission as a whole including the weights 40 and arms 38. A compression spring 49 and a tension spring 51 are mounted between a cross member 53 on the frame 34 and a cross member 55 connecting arms 38 and serve to compensate vertical loads applied to the transmission 36 by the rubber shafts leading to the wheels.

In operation of this modification the resilience of the rubber disks 44 is so proportioned to the amplitude of vibration of the transmission as a whole as to prevent transmission to the frame brackets 48 of any appreciable force, as previously described. It will be seen that the impulses of torque reaction about the wheel axis will cause intermittent couples to act on the transmission as a whole about its center of gravity. The disks 44 permit the transmission as a whole to oscillate to the maximum amplitude attained without transmitting appreciable force to the frame. The impulses of torque reaction about the propeller shaft 46 are likewise absorbed in the resilient mountings 44 since the transmission as a whole will be permitted to oscillate about its center of gravity on an axis coinciding with the axis of propeller shaft 46, because the resilient disks 44 permit sufficient up motion on one side and down motion on the other, or vice versa, to take care of limited amplitudes of oscillation about this axis.

In the modification illustrated in Figs. 14–17, inclusive, a motor vehicle frame 50 is provided having frame brackets 52 and rubber disks 54 secured to metal disks 56 all corresponding to the equivalent parts illustrated in Fig. 11. The transmission 58 has secured thereto arms 60 which differ from the arms 38 shown in Fig. 11 in that they do not extend forward of the mounting plates 56. The propeller shaft 61 is a rigid shaft without a universal joint so that torque impulses about the wheel axis may be transmitted from the transmission to the propeller shaft 61. At the forward end of the propeller shaft 61 there is secured an auxiliary flywheel 62, the weight of which is so correlated with the weight of the transmission and propeller shaft as to locate the center of gravity at the center of the resilient mountings 54. To the rear of the auxiliary flywheel 62 an anti-friction bearing 64 is carried by the propeller shaft 61, the outer race of which carries projections 66, which in turn are secured to a series of springs 68. The outer ends of the springs 68 are adjustably secured as by bolts 70 to a rigid mounting point on the vehicle which may conveniently take the form of a housing 72 around the flywheel of the motor. The flywheel 62 has securely bolted thereto an annular disk 74 projecting from the periphery thereof and resiliently secured to a second annular disk 76 by an interrupted annulus of rubber 78 alternately vulcanized to the disks 74 and 76 (Fig. 16A). The annular disk 76 is secured to the flywheel 79 of the vehicle motor.

Figure 14:
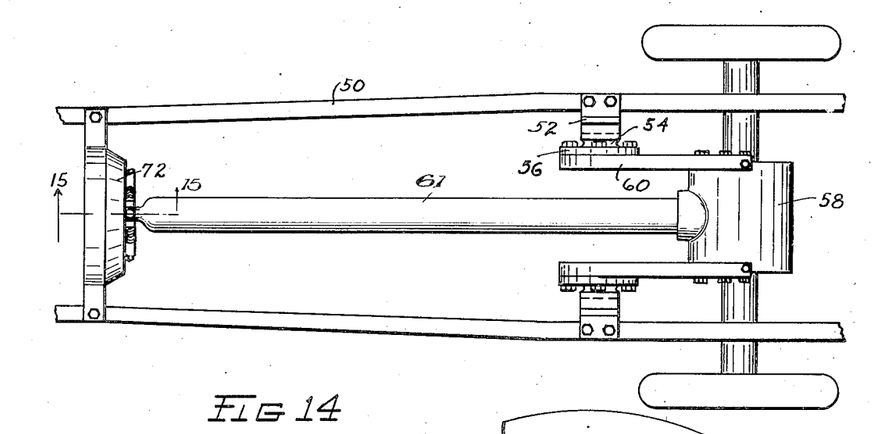
Fig. 14 is a plan view of a motor vehicle embodying a third form of the present invention.
Figures 15, 16:
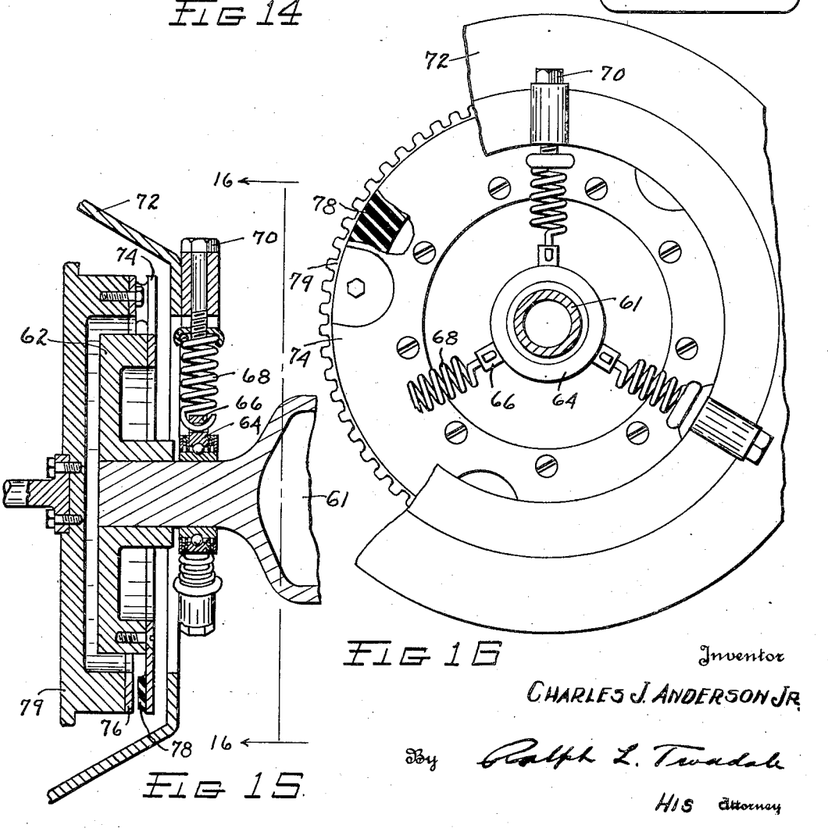
Fig. 15 is a cross section on line 15—15 of Fig. 14.
Fig. 16 is a cross section on line 16—16 of Fig. 15.
Figures 16A, 17, 18, 19, 20:
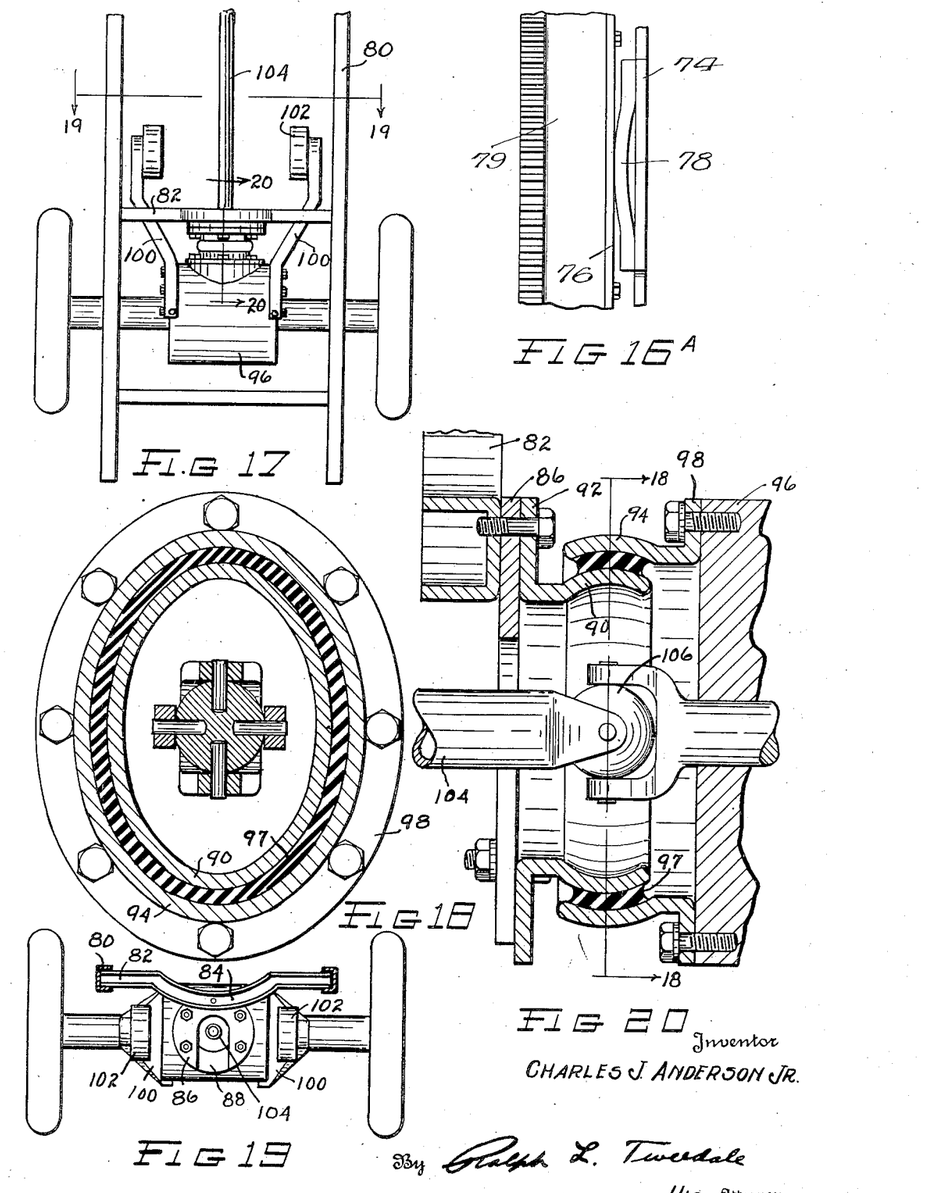
Fig. 16A is a detail view looking at the edge of the flywheel in Fig. 16.
Fig. 17 is a plan view of a motor vehicle embodying a fourth form of the present invention.
Fig. 18 is a cross section on line 18—18 of Fig. 20.
Fig. 19 is a cross section on line 19—19 of Fig. 17.
Fig. 20 is a cross section on line 20—20 of Fig. 17.

In operation of this modification the flywheel 62, propeller shaft 61 and transmission 58 form a rigid structure having a center of gravity on an axis joining the centers of the resilient blocks 54. As in the modification shown in Fig. 11, the maximum amplitude of vibration of the transmission as a whole is limited to a value at which the force transmitted by the resilient blocks 54 to the frame is negligible. The bearing 64 and springs 68 act to retain the flywheel 62 concentric to the flywheel 79 while the engine is being started. As soon as the engine gains speed, however, the flywheel 62 will tend to maintain its own center independently of the flywheel 79, while also moving up and down and sidewise in space to a slight degree as the system oscillates about its center of gravity.

The preferred modification of the invention is illustrated in Figs. 17–20, inclusive, in which a motor vehicle frame 80 has a cross member 82 rigidly secured thereto having a depending portion 84 at the middle thereof. Secured to the depending portion 84 is a flange 86 having a slot 88 opening downwardly therefrom for purposes of assembly and disassembly. Bolted to the disk 86 is a tubular member 90 having a flange 92 thereon. The opposite end of the tubular member 90 is formed substantially in the shape of a portion of an ellipsoid of revolution, the ellipse having its minor axis in the propeller shaft axis and its major axis perpendicular thereto and being revolved about the major axis. In other words, it is roughly the shape of an egg. Another tubular member 94 is bolted to the transmission 96 by means of a flange 98. The shape of the tubular portion 94 corresponds to the shape of the tubular portion 90 except that it is larger in size, the space between the two tubular portions 90 and 94 being occupied by a layer of rubber 97 preferably vulcanized to both of them. The transmission 96 has rigidly secured thereto a pair of arms 100 which may be constructed to diverge toward the front and carry weights 102 at the ends thereof. The divergence of the arms 100 increases the moment of inertia about the axis of the propeller shaft 104 in addition to the increase in moment of inertia about the axis of the wheels derived from the placing of the weights 102 considerably forward of the transmission. The propeller shaft 104 has a universal joint 106 of any known construction located coincident with the center of the rubber mounting 97.

In operation of this modification the moment of inertia of the transmission as a whole, including the arms 100 and weights 102, is increased to such a value both about the axis of the propeller shaft 104 and about the axis of the wheels that the maximum amplitude attained under the periodic impulses of torque reaction is within the range of movement permitted by the rubber mounting. The center of gravity of the transmission as a whole being coincident with the center of the rubber mounting 97 and the radial distance of the rubber mounting 97 from the center of gravity being comparatively small, permits a considerable amplitude of movement of the transmission in any direction without a large displacement of the mounting 97, as described. The peculiar shape of the tubular members 90 and 94 provides for a varying ratio between force and displacement of the rubber, depending on the average torque applied thereto at any time. Curvature of the members 90 and 94 may be so varied as to produce any force-displacement curve desired, it being preferred to approximate a parabolic displacement curve as near as possible. The advantage in a parabolic displacement curve is that with the types of transmissions under consideration it is desirable to have an extremely soft mounting at low speeds and with small power output when the impulses of torque reaction are at high values. Under such conditions the average torque and stress of the rubber mounting is small and the tubular member 90 occupies a position nearly concentric to the tubular member 94. In this position the force-displacement ratio lies on the flat part of the parabolic curve in which displacement is large relative to the force applied, due to the fact that the rubber is stressed principally in shear. This produces the desired soft mounting for these conditions. When, however, the speed and power output become high the higher average stress on the rubber 97 displaces the tubular member 94 relative to the tubular member 90 to such an extent that a large portion of the rubber is stressed in compression rather than in shear and the force-displacement ratio lies along the steep part of the parabolic curve and the rubber mounting is stiffer. Since at higher speeds the impulses of torque reaction are smaller a stiffer mounting may be used without permitting appreciable force to be transmitted to the frame. It is to be noted that the form of tubular members 90 and 94 provides for a parabolic force-displacement curve, not only about the axis of the propeller shaft, but also about the axis parallel to the wheel axis.

It will thus be seen that there have been provided several forms of mountings for a power transmission in which impulses of torque reaction will be utilized to oscillate the transmission as a whole without transmitting appreciable force to the frame, thus eliminating annoying vibration which would otherwise be felt if the transmission were mounted rigidly.

I claim:

1. In a motor vehicle having a frame, the combination of a power transmission having input and output shafts and adapted to transmit power from the input shaft to the output shaft in a succession of torque impulses produced within the transmission itself and at variable ratios of average torque, a housing for the transmission, means rigidly connected with the housing for increasing the moment of inertia of the housing about the center of gravity of the transmission and said means, and resilient means connecting the transmission to the frame, said last named means being sufficiently flexible to permit the transmission to oscillate about said center of gravity to the maximum amplitude attainable under ordinary operating conditions without transmitting noticeable force to the frame.

2. In a motor vehicle having a frame, the combination of a power transmission having an input shaft and an output shaft and adapted to transmit power from the input shaft to the output shaft in a succession of torque impulses produced within the transmission itself and at variable ratios of average torque, and resilient means for mounting the transmission in the frame, the degree of resilience of the mounting connection and the moment of inertia of the transmission being so correlated as to absorb the reaction of the largest torque impulse produced in ordinary operation of the transmission in oscillation of the transmission relative to the frame.

3. In a motor vehicle, a frame, a motor and traction wheels, the combination of a power transmission having an input shaft connected with the motor and output shafts at right angles thereto connected to the wheels and adapted to transmit power from the input shaft to the output shafts in a succession of torque impulses produced within the transmission itself and at variable ratios of average torque, means in the output shafts permitting the transmission to oscillate relative to the wheel ends thereof, and resilient means for mounting the transmission in the frame, the degree of resilience of the mounting connection and the moment of inertia of the transmission being so correlated as to absorb the reaction of the largest torque impulse produced in ordinary operation of the transmission in oscillation of the transmission relative to the frame.

4. In a motor vehicle having a frame, a motor and traction wheels, the combination of a power transmission which is adapted to transmit power from the motor to the wheels in a succession of torque impulses produced within the transmission itself and at variable ratios of average torque, and means for mounting said transmission in the frame, said means having sufficient resilience to permit the transmission to oscillate about its center of gravity with a sufficient amplitude to absorb substantially all the energy of the impulses of torque reaction.

5. In a motor vehicle having a frame, a motor and traction wheels, the combination of a power transmission which is adapted to transmit power from the motor to the wheels in a succession of torque impulses produced within the transmission itself and at variable ratios of average torque, a casing for the transmission having a high moment of inertia, and means for mounting said transmission in the frame, said last means having sufficient resilience to permit the transmission to oscillate about its center of gravity with a sufficient amplitude to absorb substantially all the energy of the impulses of torque reaction.

6. In a motor vehicle having a frame, a motor and traction wheels, the combination of a power transmission which is adapted to transmit power from the motor to the wheels in a succession of torque impulses produced within the transmission itself and at variable ratios of average torque, means for increasing the moment of inertia of the transmission and for locating the center of gravity of the transmission as a whole including said means at a distance from the center of gravity of the transmission proper, and means for mounting said transmission in the frame, said last means having sufficient resilience to permit the transmission to oscillate about its center of gravity with a sufficient amplitude to absorb substantially all the energy of the impulses of torque reaction.

7. In a motor vehicle having a frame, a motor and traction wheels, the combination of a power transmission which is adapted to transmit power from the motor to the wheels in a succession of torque impulses produced within the transmission itself and at variable ratios of average torque, means for increasing the moment of inertia of the transmission and for locating the center of gravity of the transmission as a whole including said means to one side of the transmission proper, and means for mounting said transmission in the frame, said last means having sufficient resilience to permit the transmission to oscillate about its center of gravity with a sufficient amplitude to absorb substantially all the energy of the impulses of torque reaction.

8. In a motor vehicle having a frame, a motor and traction wheels, the combination of a power transmission which is adapted to transmit power from the motor to the wheels in a succession of torque impulses produced within the transmission itself and at variable ratios of average torque, an input shaft for transmitting power from the motor to the wheels, at least one output shaft for transmitting power from the transmission to the wheels, and means for mounting said transmission in the frame, said means having sufficient resilience to permit the transmission to oscillate about its center of gravity with a sufficient amplitude to absorb substantially all the energy of the impulses of torque reaction.

9. In a motor vehicle having a frame, a motor and traction wheels, the combination of a power transmission which is adapted to transmit power from the motor to the wheels in a succession of torque impulses produced within the transmission itself and at variable ratios of average torque, an input shaft for transmitting power from the motor to the wheels, at least one output shaft for transmitting power from the transmission to the wheels, and means for mounting said transmission in the frame, said means having sufficient resilience to permit the transmission to oscillate about its center of gravity with a sufficient amplitude to absorb substantially all the energy of the impulses of torque reaction, and a universal joint in the input shaft substantially at the center of gravity of the transmission as a whole.

10. In a motor vehicle having a frame, a motor and traction wheels, the combination of a power transmission which is adapted to transmit power from the motor to the wheels in a succession of torque impulses produced within the transmission itself and at variable ratios of average torque, means for increasing the moment of inertia of the transmission, and means for mounting said transmission in the frame, said last means having sufficient resilience to permit the transmission to oscillate about its center of gravity with a sufficient amplitude to absorb substantially all the energy of the impulses of torque reaction and including means for varying the force-displacement ratio in accordance with the variations in average torque.

11. In a motor vehicle having a frame, a motor and traction wheels, the combination of a power transmission which is adapted to transmit power from the motor to the wheels in a succession of torque impulses produced within the transmission itself and at variable ratios of average torque, an input shaft for transmitting power from the motor to the wheels, said shaft being rigid relative to the transmission except for rotation about its own axis, means for increasing the moment of inertia of the transmission and for locating the center of gravity of the transmission as a whole including said means at a distance from the center of gravity of the transmission proper, said means including a flywheel at the motor end of the input shaft and movable relative to the motor, and means for mounting said transmission in the frame, said means having sufficient resilience to permit the transmission to oscillate about its center of gravity with a sufficient amplitude to absorb substantially all the energy of the impulses of torque reaction.

12. In a motor vehicle having a frame, a motor and traction wheels, the combination of a power transmission which is adapted to transmit power from the motor to the wheels in a succession of torque impulses produced within the transmission itself and at variable ratios of average torque, an input shaft for transmitting power from the motor to the wheels, at least one output shaft for transmitting power from the transmission to the wheels and permitting motion of the transmission relative to the wheels, and means for mounting said transmission in the frame, said means having sufficient resilience to permit the transmission to oscillate about its center of gravity with a sufficient amplitude to absorb substantially all the energy of the impulses of torque reaction.

13. In a motor vehicle having a frame, a motor and traction wheels, the combination of a power transmission which is adapted to transmit power from the motor to the wheels in a succession of torque impulses produced within the transmission itself and at variable ratios of average torque, an input shaft for transmitting power from the motor to the wheels, means for increasing the moment of inertia of the transmission and for locating the center of gravity of the transmission as a whole including said means at a distance from the center of gravity of the transmission proper, at least one output shaft for transmitting power from the transmission to the wheels, a universal joint in the input shaft substantially at the center of gravity of the transmission as a whole, and means for mounting said transmission in the frame, said last means having sufficient resilience to permit the transmission to oscillate about its center of gravity with a sufficient amplitude to absorb substantially all the energy of the impulses of torque reaction.

14. In a motor vehicle the combination of a frame, traction wheels, a power transmission which is adapted to transmit power to the wheels in a succession of torque impulses produced within the transmission itself and at variable ratios of average torque including means for increasing the moment of inertia of the transmission, and means for mounting said transmission in the frame, said last means having sufficient resilience to permit the transmission to oscillate about its center of gravity with a sufficient amplitude to absorb substantially all the energy of the impulses of torque reaction.

15. In a motor vehicle the combination of a frame, traction wheels, a power transmission which is adapted to transmit power to the wheels in a succession of torque impulses produced within the transmission itself and at variable ratios of average torque including means for mounting said transmission in the frame, said means having sufficient resilience to permit the transmission to oscillate about its center of gravity with a sufficient amplitude to absorb substantially all the energy of the impulses of torque reaction and including means for varying the force-displacement ratio in accordance with the variations in average torque.

16. In a motor vehicle having a frame, a motor and traction wheels, the combination of a power transmission which is adapted to transmit power from the motor to the wheels in a succession of torque impulses produced within the transmission itself and at variable ratios of average torque, means for increasing the moment of inertia of the transmission, and means for mounting said transmission in the frame, said last means having sufficient resilience to permit the transmission to oscillate about its center of gravity with a sufficient amplitude to absorb substantially all the energy of the impulses of torque reaction and including a block of rubber-like material bounded by relatively movable inner and outer rigid members of noncircular form, one of which is rigidly connected with the frame and the other rigidly connected to the transmission.

17. In a motor vehicle having a frame, a motor and traction wheels, the combination of a power transmission which is adapted to transmit power from the motor to the wheels in a succession of torque impulses produced within the transmission itself and at variable ratios of average torque, means for increasing the moment of inertia of the transmission, and means for mounting said transmission in the frame, said last means having sufficient resilience to permit the transmission to oscillate about its center of gravity with a sufficient amplitude to absorb substantially all the energy of the impulses of torque reaction and including a block of rubber-like material bounded by relatively movable inner and outer rigid members of oval form, one of which is rigidly connected with the frame and the other rigidly connected to the transmission.

18. In a motor vehicle, the combination of a frame, traction wheels, a power transmission which is adapted to transmit power to the wheels in a succession of torque impulses produced within the transmission itself and at variable ratios of average torque including means for mounting said transmission in the frame, said means having sufficient resilience to permit the transmission to oscillate about its center of gravity with a sufficient amplitude to absorb substantially all the energy of the impulses of torque reaction and including a block of rubber-like material bounded by relatively movable inner and outer rigid members of non-circular form, one of which is rigidly connected with the frame and the other rigidly connected to the transmission.

19. In a motor vehicle, the combination of a frame, traction wheels, a power transmission which is adapted to transmit power to the wheels in a succession of torque impulses produced within the transmission itself and at variable ratios of average torque including means for mounting said transmission in the frame, said means having sufficient resilience to permit the transmission to oscillate about its center of gravity with a sufficient amplitude to absorb substantially all the energy of the impulses of torque reaction and including a block of rubber-like material bounded by relatively movable inner and outer rigid members of oval form, one of which is rigidly connected with the frame and the other rigidly connected to the transmission.

20. In a motor vehicle having a frame, the combination of a power transmission having an output shaft and adapted to transmit power to the output shaft in a succession of torque impulses produced within the transmission itself and at variable ratios of average torque, and resilient means for mounting the transmission in the frame, the degree of resilience of the mounting connection and the moment of inertia of the transmission being so correlated as to absorb the reaction of the largest torque impulse produced in ordinary operation of the transmission in oscillation of the transmission relative to the frame.

21. In a motor vehicle having a frame and traction wheels, the combination of a power transmission which is adapted to transmit power to the wheels in a succession of torque impulses produced within the transmission itself and at variable ratios of average torque, at least one output shaft for transmitting power from the transmission to the wheels and permitting motion of the transmission relative to the wheels and means for mounting said transmission in the frame, said means having sufficient resilience to permit the transmission to oscillate about its center of gravity with a sufficient amplitude to absorb substantially all the energy of the impulses of torque reaction.

22. In a motor vehicle, the combination of a frame, traction wheels, a power transmission which is adapted to transmit power to the wheels in a succession of torque impulses produced within the transmission itself and at variable ratios of average torque, and means for mounting said transmission in the frame, said last means having sufficient resilience to permit the transmission to oscillate about its center of gravity with a sufficient amplitude to absorb substantially all the energy of the impulses of torque reaction.

23. In a motor vehicle having a frame and traction wheels, the combination of a power transmission which is adapted to transmit power to the wheels in a succession of torque impulses produced within the transmission itself and at variable ratios of average torque, and means for mounting said transmission in the frame, said means including resilient material disposed symmetrically with respect to the center of gravity of the transmission and having sufficient resilience to permit the transmission to oscillate about its center of gravity with a sufficient amplitude to absorb substantially all the energy of the impulses of torque reaction.

24. In a motor vehicle having a frame and traction wheels, the combination of a power transmission which is adapted to transmit power to the wheels in a succession of torque impulses produced within the transmission itself and at variable ratios of average torque, and means for mounting said transmission in the frame, said means including resilient material disposed symmetrically with respect to the center of gravity of the transmission, the degree of resilience of said mounting means being so proportioned with respect to the moment of inertia of the transmission as to absorb the reaction of the largest torque impulse produced in the ordinary operation of the transmission in oscillation of the transmission relative to the frame.

CHARLES J. ANDERSON, Jr.